(12) United States Patent
Hartman

(10) Patent No.: US 8,554,478 B2
(45) Date of Patent: Oct. 8, 2013

(54) CORRELATION POSITION DETERMINATION

(75) Inventor: Randolph G. Hartman, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 708 days.

(21) Appl. No.: 11/678,313

(22) Filed: Feb. 23, 2007

(65) Prior Publication Data

US 2008/0208455 A1 Aug. 28, 2008

(51) Int. Cl.
*G01C 21/00* (2006.01)
*G01S 13/88* (2006.01)

(52) U.S. Cl.
USPC ........... 701/514; 701/23; 701/25; 701/408; 701/448; 701/472; 180/167; 180/168; 180/169; 342/46; 342/118; 342/147; 342/350; 340/988; 340/995.1; 340/995.19; 340/995.24

(58) Field of Classification Search
USPC .......... 701/207, 3, 23, 25, 26, 28, 117, 120, 701/400, 408, 409, 445, 446, 447, 448, 450, 701/461, 467, 468, 469, 472, 494, 495, 514, 701/519, 521, 527, 540; 342/42, 46, 118, 342/147, 350, 357.2, 357.21, 357.22, 357.25, 342/450; 180/167, 168, 169; 340/935, 995.1, 340/995.19, 995.24, 995.25
See application file for complete search history.

(56) References Cited

U.S. PATENT DOCUMENTS

| | | | | |
|---|---|---|---|---|
| 4,937,751 A * | 6/1990 | Nimura et al. | | 701/211 |
| 5,467,273 A | 11/1995 | Faibish et al. | | |
| 5,661,650 A * | 8/1997 | Sekine et al. | | 701/82 |
| 5,680,306 A * | 10/1997 | Shin et al. | | 701/213 |
| 5,680,313 A * | 10/1997 | Whittaker et al. | | 701/300 |
| 5,684,696 A * | 11/1997 | Rao et al. | | 701/25 |
| 5,724,123 A | 3/1998 | Tanaka | | |
| 5,838,562 A * | 11/1998 | Gudat et al. | | 701/213 |
| 5,956,250 A * | 9/1999 | Gudat et al. | | 701/26 |
| 6,445,983 B1 * | 9/2002 | Dickson et al. | | 701/23 |
| 6,502,033 B1 * | 12/2002 | Phuyal | | 701/214 |
| 6,853,906 B1 * | 2/2005 | Michi et al. | | 701/207 |

(Continued)

FOREIGN PATENT DOCUMENTS

JP 10300493 11/1998

OTHER PUBLICATIONS

European Patent Office, "European Search Report", Mar. 22, 2010, Published in: EP.

(Continued)

*Primary Examiner* — Rami Khatib

(74) *Attorney, Agent, or Firm* — Fogg & Powers LLC

(57) ABSTRACT

Methods and apparatus for navigating with the use of correlation within a select area are provided. One method includes, storing data required to reconstruct ranges and associated angles to objects along with statistical accuracy information while initially traversing throughout the select area. Measuring then current ranges and associated angles to the objects during a subsequent traversal throughout the select area. Correlating the then current ranges and associated angles to the objects to reconstructed ranges and associated angles to the objects from the stored data. Determining at least one of then current location and heading estimates within the select area based at least in part on the correlation and using the least one of the then current location and heading estimates for navigation.

13 Claims, 9 Drawing Sheets

(56) References Cited

U.S. PATENT DOCUMENTS

| | | |
|---|---|---|
| 7,211,980 B1 * | 5/2007 | Bruemmer et al. .......... 318/587 |
| 7,552,008 B2 * | 6/2009 | Newstrom et al. ........... 701/207 |
| 2002/0060784 A1 | 5/2002 | Pack |
| 2006/0190124 A1 * | 8/2006 | Makela ........................ 700/213 |
| 2006/0197938 A1 | 9/2006 | Halmos et al. |
| 2007/0219720 A1 * | 9/2007 | Trepagnier et al. ........... 701/300 |
| 2008/0039991 A1 * | 2/2008 | May et al. ...................... 701/25 |
| 2008/0085686 A1 * | 4/2008 | Kalik ........................ 455/154.1 |

OTHER PUBLICATIONS

European Patent Office, "Office Action", Dec. 29, 2011, Published in: EP.

Japan Patent Office, "Notification of Reasons for Rejection", from Foreign Counterpart of U.S. Appl. No. 11/678,313, Jan. 7, 2013, pp. 1-8, Published in: JP.

* cited by examiner

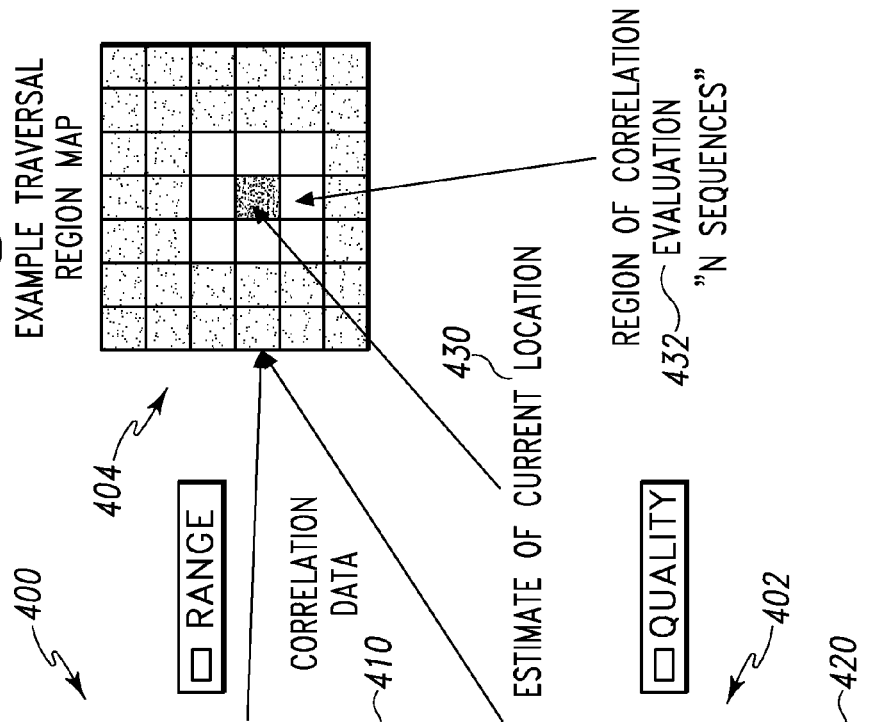
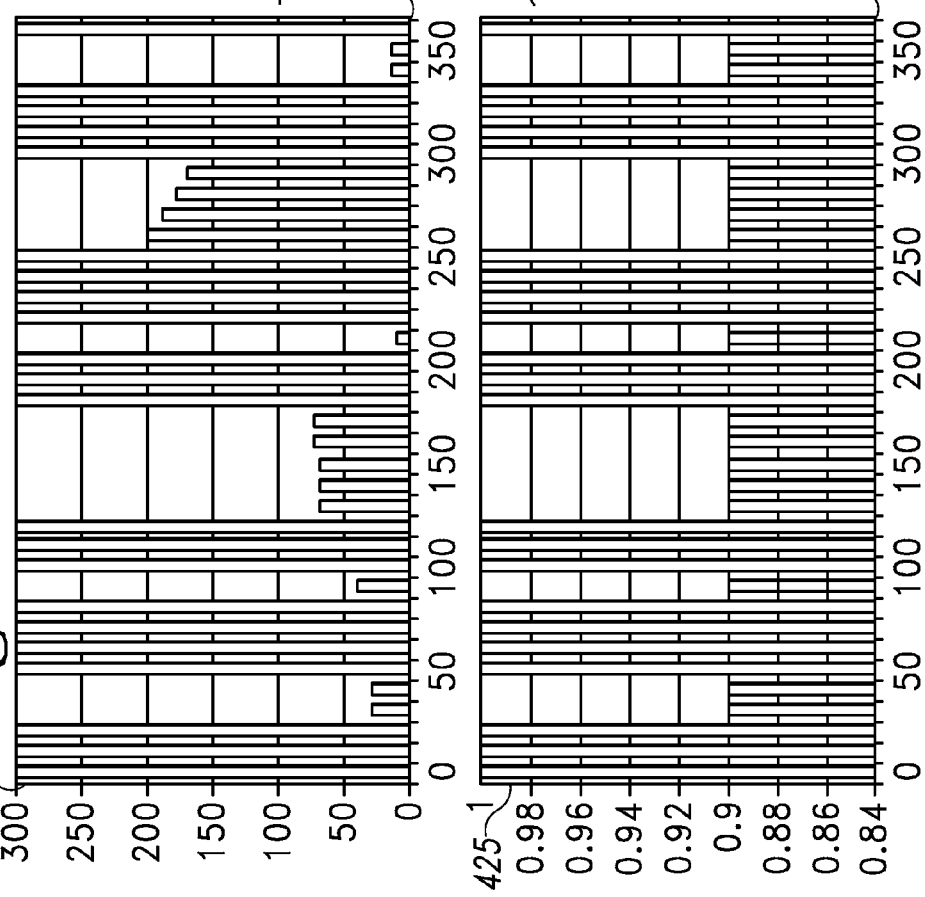

CORRELATION POSITION DETERMINATION

BACKGROUND

The ability to determine a location of a moving vehicle within an area has many applications. For example, the use of Global Positioning Systems (GPS) to determine the location of a vehicle on a map has become common place. The ability to traverse through an area without human intervention is also desired. For example, operator-less vehicles for lawn mowing operations, mining truck operations or any activity where you have a relatively repetitive travel pattern would be useful. The use GPS, however, has some limitations. For example, GPS signals may not available in the desired locations where visibility of satellites is impossible.

For the reasons stated above and for other reasons stated below which will become apparent to those skilled in the art upon reading and understanding the present specification, there is a need in the art for an efficient and effective method of determining a location of a vehicle as it traverses through an area.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In one embodiment, method of navigating with the use of correlation within a select area is provided. The method includes, storing data required to reconstruct ranges and associated angles to objects along with statistical accuracy information while initially traversing throughout the select area. Measuring then current ranges and associated angles to the objects during a subsequent traversal throughout the select area. Correlating the then current ranges and associated angles to the objects to reconstructed ranges and associated angles to the objects from the stored data. Determining at least one of then current location and heading estimates within the select area based at least in part on the correlation and using the least one of the then current location and heading estimates for navigation.

BRIEF DESCRIPTION OF THE DRAWINGS

The present invention can be more easily understood and further advantages and uses thereof more readily apparent, when considered in view of the detailed description and the following figures in which:

FIG. 4A is an example range graph of one embodiment of the present invention;

FIG. 4B is an example quality graph of one embodiment of the present invention;

FIG. 4C is an example traverse region map of one embodiment of the present invention;

In accordance with common practice, the various described features are not drawn to scale but are drawn to emphasize specific features relevant to the present invention. Reference characters denote like elements throughout figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
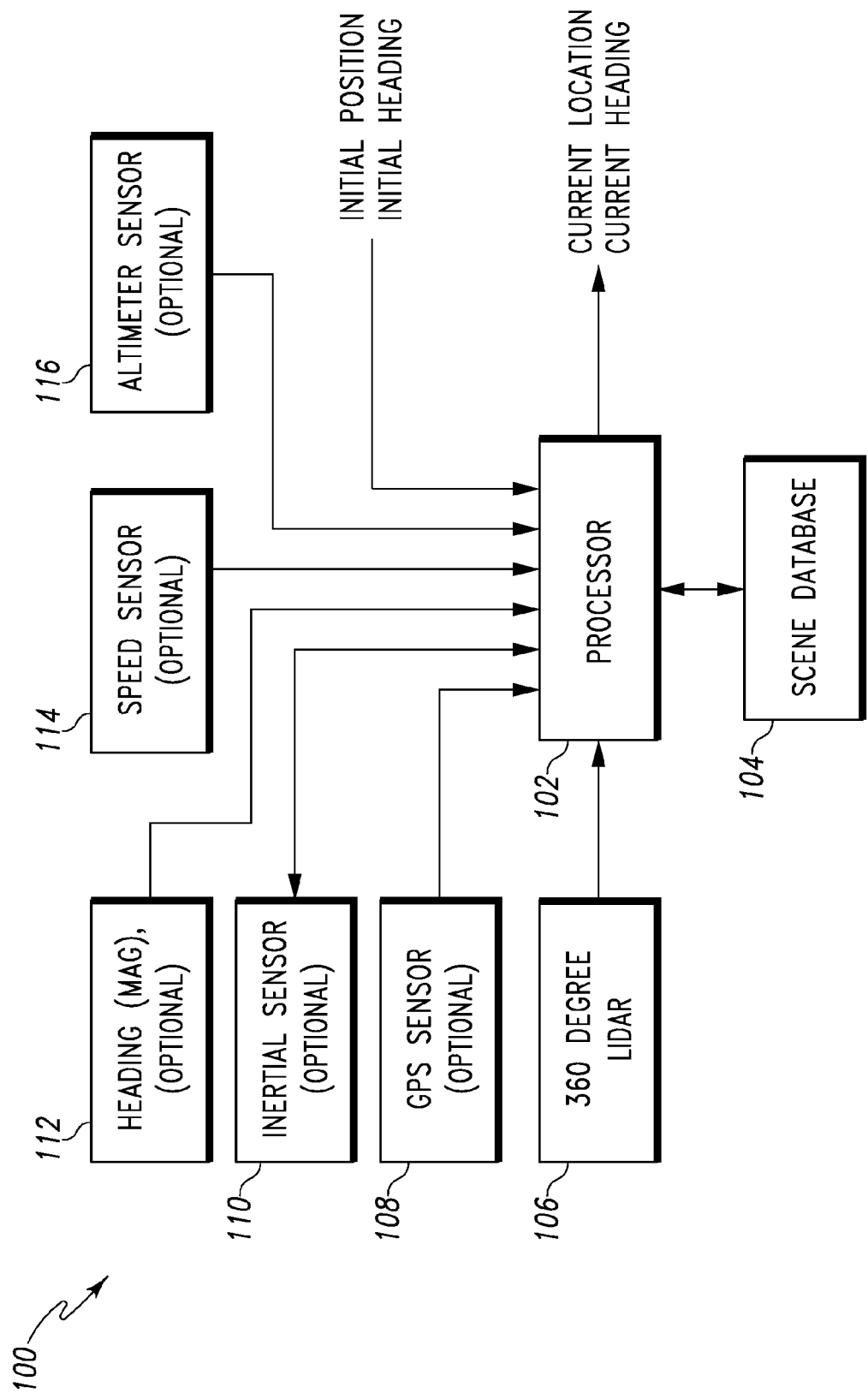
FIG. 1 is a block diagram of a navigation system of one embodiment of the present invention.

Embodiments of the present invention provide a method of determining a location of a device in a selected area. In embodiments, a ranging device is used to first measure and store the distance and angles to objects as a vehicle that includes the ranging device is traversed throughout the area. Then on subsequent trips, this data is correlated with real time range measurements to the objects to determine the location of the device. Referring to FIG. 1 a navigation system 100 of one embodiment of the present invention is provided. As illustrated, the navigation system 100 includes a processor 102 that is in communication with a scene database 104, a ranging device 106 (which in this embodiment is a 360 degree laser imaging and ranging device (LIDAR) device 106). In some embodiments the location detection system includes one or more additional sensors such as a Global Positioning System (GPS) sensor 108, an inertial sensor 110, a heading sensor 112, a speed sensor 114 and an altimeter sensor 116.

The ranging device 106 provides ranging data, including distances and angles, to the processor of objects near the ranging device. As indicated above, in one embodiment, a 360 degree LIDAR device 106 is used. A LIDAR device 106 is a measuring system that detects and locates objects similar to radar but uses laser light. The 360 degrees allows the device to rotate so that objects in all directions can be located and ranged as a vehicle traverses throughout an area. Although, the a LIDAR device 106 is discussed, it will be understood that any type of ranging device that is rotated through or has visibility to 360 degrees could be used, and that the present invention is not limited to LIDAR devices. For example, other ranging devices such as laser rangefinders, radar rangefinders, stereovision rangefinders, flash LADARs and the like could be used. In embodiments, as the vehicle passes through the area to be ranged the first time, the ranging device determines distance to objects (distance data) as well as earth referenced angles to the objects in the area and this ranging data is stored along with a quality factor in the scene database 104. The information stored in the scene database 104 can vary in method to include locations of objects which would cause a measurement, however what is required is that the range and angle can be reconstructed at a future time. On subsequent trips through the area, the then current ranging readings are correlated with the stored ranging data by an algorithm in the processor 102. From the correlation, a location of the vehicle is determined by the processor.

In the embodiment that includes an inertial sensor 110, additional information is provided to the processor 102 to estimating the location of the vehicle. Generally, an inertial sensor 110 estimates a present position based on a prior knowledge of time, initial position, initial velocity, initial orientation without the aid of external information. As illustrated in FIG. 1, an input is provided that provides the initial position and the initial heading. The information generated by the inertial sensor 110 in this embodiment is provided to the processor 102. The processor 102 in this embodiment uses this data in combination with distance and angle data from the ranging device 106 to determine the current location of the vehicle. The current location and current heading is output as illustrated in FIG. 1. The output of the current heading and current location can be used for navigation.

Figure 2:
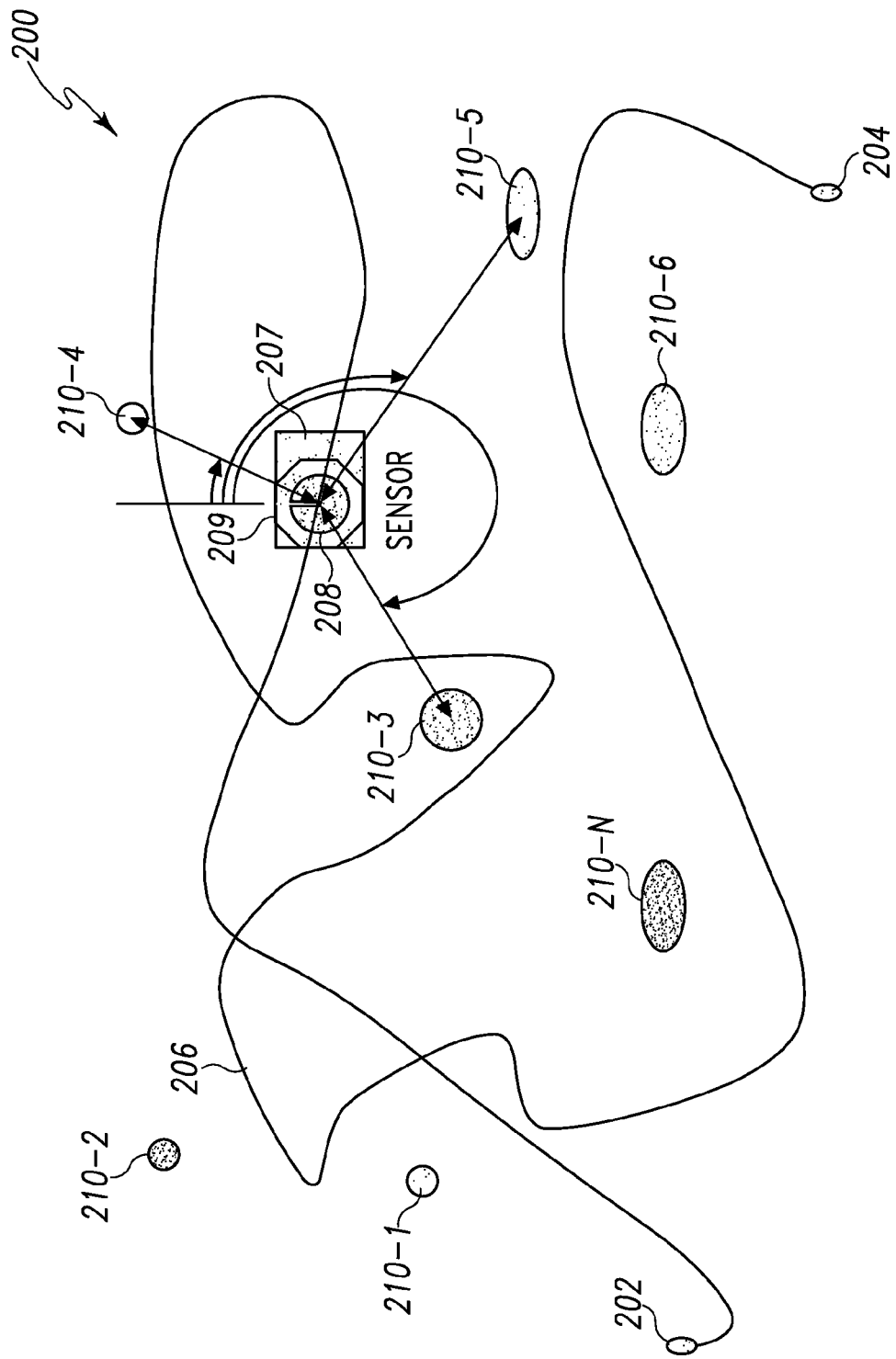
FIG. 2 is a traverse diagram of a vehicle traversing through a select area having a navigation system of one embodiment of the present invention.

FIG. 2 is a traverse diagram 200 illustrating a vehicle 207 passing through an area 200 to be traversed. As illustrated, the area 200 to be traversed includes objects 210-1 through 210-N. The vehicle 207 takes a path 206 that starts at 202 and ends at 204. The vehicle 207 includes a location detection system 208 similar to the location detection system 100 of FIG. 1. As illustrated, the location detection system 208 includes a spindle 209 that rotates 360 degrees. The ranging device 106 is rotated 360 degrees by the rotating spindle 209 so that objects in every direction can be detected. As discussed above, in one embodiment, a LIDAR 106 is used. A LIDAR is basically a laser range finder which transmits and receives a signal through an angle up to 360 degress through the use of optics and a rotating mirror.

Figure 3:
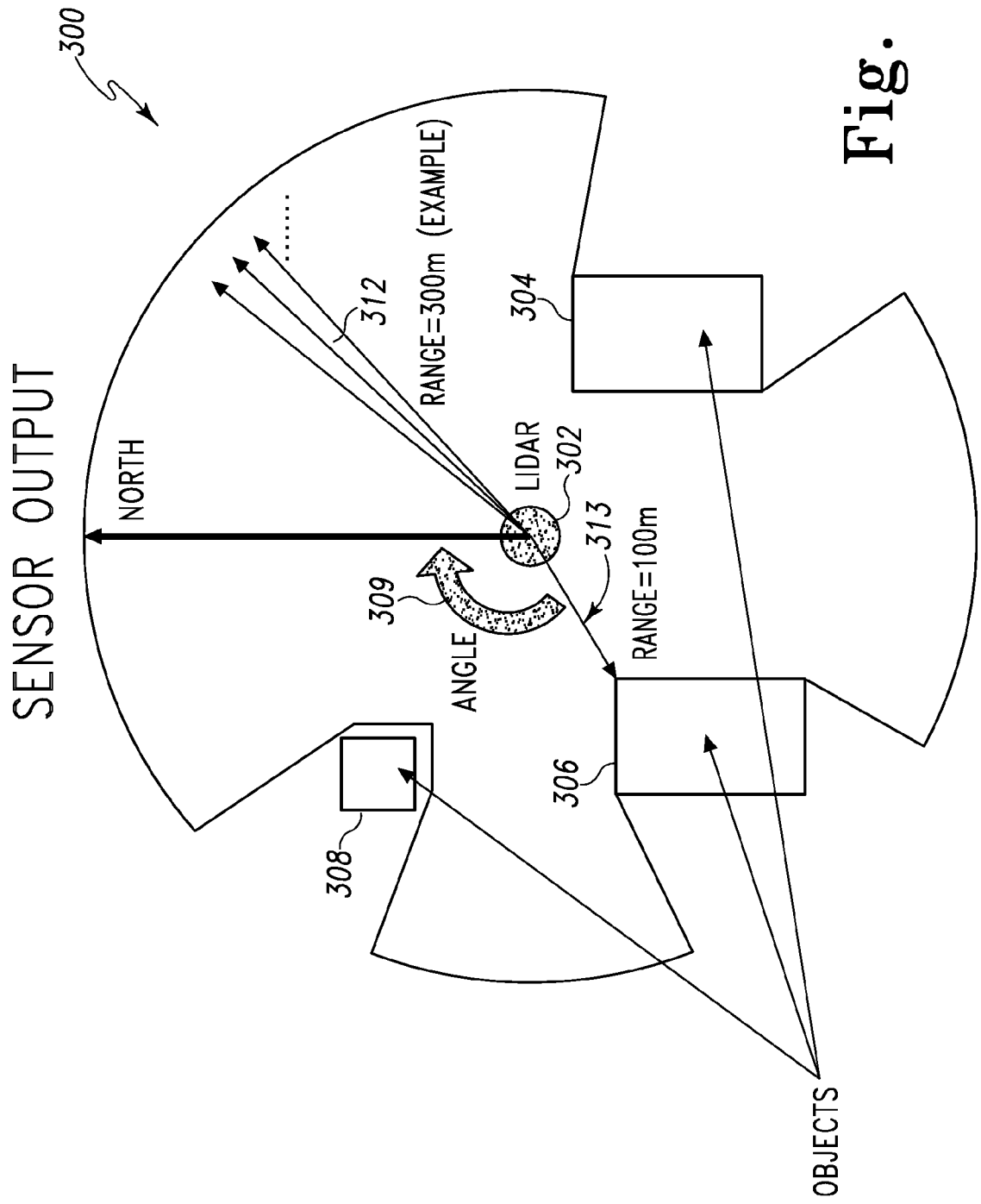
FIG. 3 is a diagram of a sensor output of one embodiment of the present invention.

Referring to FIG. 3 a sensor output diagram 300 of one embodiment of the present invention is illustrated. In particular, FIG. 3 illustrates a 360 degree scan path of a LIDAR 302 and examples of measured ranges 312 and 313. As illustrated, in this example, objects near the LIDAR 302 include objects 304, 306 and 308. Distance (or range) 310 to object 306 is shown as 100 m for an example. FIG. 3 also illustrates, that in embodiments of the present invention, range information is also gathered in areas were no objects are located within the range of the LIDAR 302. In this example, those areas are assigned a select range 312 which is based on the limit of the laser sensor and in this example is 300 m. In one embodiment, the scene database is data of the recorded distances to objects at associated angles. In another embodiment, other data relating to location of objects such as a map is recorded and the ranges and associated angles are regenerated from the stored data in the map. In yet another embodiment, a scene database is configured to store angles associated with no returns. An example, of a range graph 400 that illustrates ranges and associated angles is illustrated in FIG. 4A. In FIG. 4A, the angle of measurement in degrees is illustrated along axis 410. The distance is illustrated along axis 415. Range graph 400 illustrates the range to objects at select angles as the LIDAR 302 is rotated 360 degress.

FIG. 4B illustrates a quality graph 402. The angle in degrees is illustrated along axis 420 and the measure quality is illustrated along axis 425. In this embodiment a maximum of 1 represents 100% accuracy along the quality axis 420. In this embodiment quality is determined based on two factors. The first factor is the estimation of how accurate the current location was known when the data was stored during the initial traversal. This is dependant on the location and heading estimation technique used and its expected or predicted accuracy. The second factor is how accurate the scan (or ranging) method was when the data was stored during the initial traversal. This is dependant on the accuracy of the LIDAR 302 in this example and the quality of the reflection. These factors are then combined appropriately and reflected in the quality graph 402. In quality graph 402, angles that have a return in this example have a quality of about 90% as shown. Areas not showing a return in this example have a higher quality rating of 100%. This is possible in this example since distances beyond the selected range (300 m) are defined as areas not having objects. There are many methods of storing this information including estimating the location of the object for which the reflection was identified, what is important is to be able to reconstruct the range and associated angle for this location at a later time. It is also noted that in FIGS. 4A and 4B the angle axis 410 and 420 respectively is incremented by 10 degrees. This is just an example, other increments are contemplated.

An example traverse region map 404 which contains data that is capable of recreating estimates of the range, angle and quality data is illustrated in FIG. 4C. In this example, the map 404 includes 42 sectors (or sections). When traversing through the region to generate map 404, at least 1 scan for each of the 42 sectors will take place with the sample increment of 10 degrees or 36 measurements per scan. That is, in each sector 36 measurements will take place in this example to cover at total of 360 degree, 10 degrees at a step. In general in embodiments, when you subsequently traverse through the region, a current scan is correlated with one of the scans stored in the map. Once a range scan has been tested for correlation against a specific sequence defined by a specific scene and shift angle, the sequence is shifted in 10 degree steps until each starting angle is tested. As illustrated in FIG. 4C, the traversal region 404 includes a scan for the current estimated of the location 430. Hence in a subsequent traversal, location 430 represents a location on the map 404 that is an estimate of the current location and contains scan information. FIG. 4C also includes a region of correlation evaluation generally indicated as 432. Sectors 432 represent regions adjacent to and including the current estimated location. Sectors 432 have a probability of being the current location and therefore are evaluated in embodiments of the present invention. Accordingly, in this example, nine sectors will be evaluated for the current location, sector 430 and the eight adjacent sectors to 430. Many methods could be used to select the sectors to be evaluated including but not limited to increasing the number in front of the forward moving vehicle up to evaluating every sector. Hence, the present invention is not limited to a particular method of selecting sectors to evaluate. It is also noted that in FIG. 4C 42 sectors are used. This is just an example, other numbers of sectors and methods for selection are contemplated.

Figure 5:
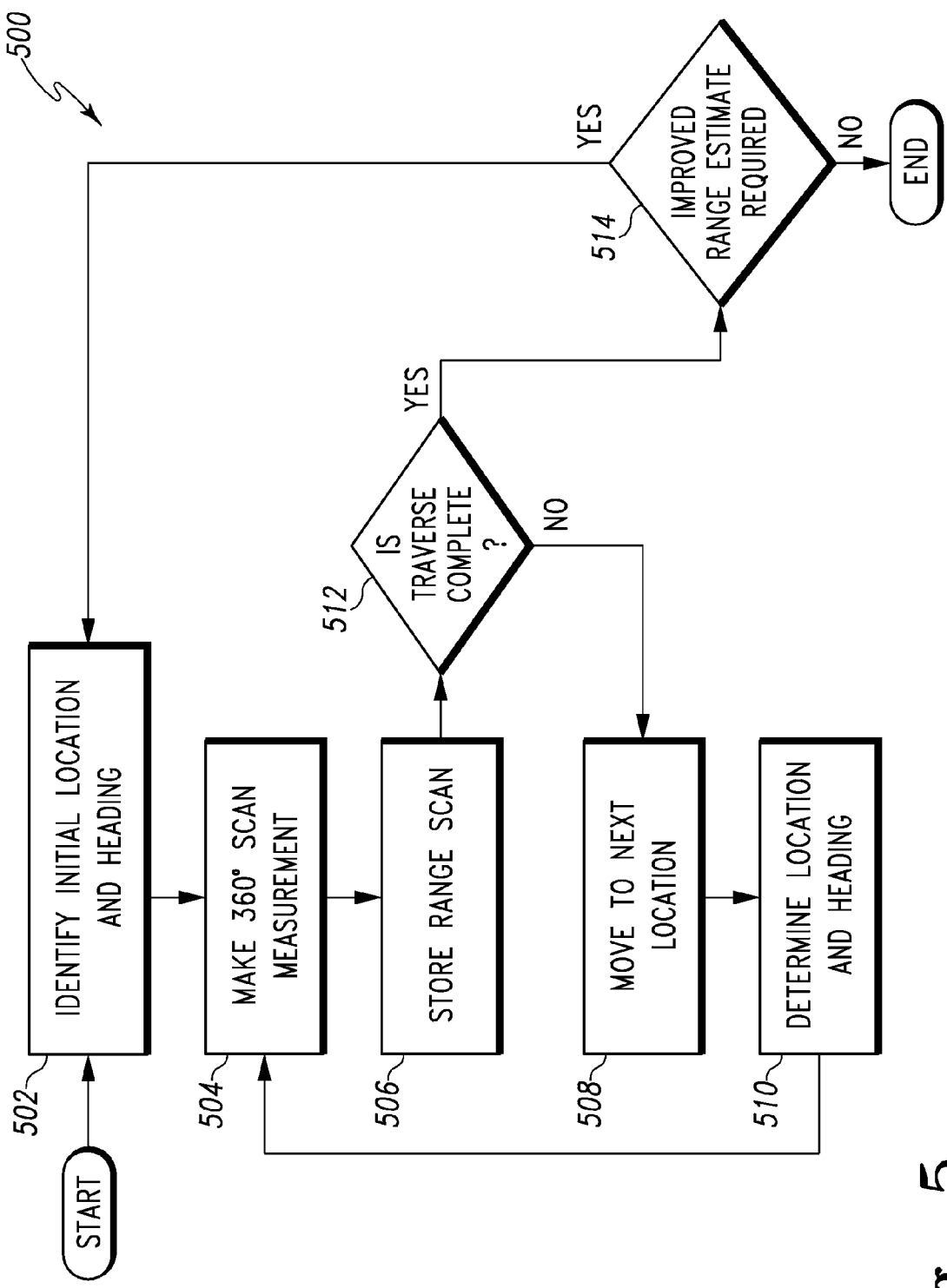
FIG. 5 is a map generation flow diagram of one embodiment of the present invention.

FIG. 5 is a scene database generating flow diagram 500 illustrating one method of collecting data to create a scene database for a select area of one embodiment of the present invention. As illustrated, the method begins by identifying an initial location and heading (502). A scan measurement of 360 degress is then performed (504). Although, a scan measurement of 360 degree is illustrated, a scan measurement of less than 360 degress can be used. In fact, in one embodiment, a smaller scan (less than 360 degress) is performed. In the less than 360 degree scan, performance can be lost and it is important to insure that the reference measurements (data collected in the initial traversal) are consistent with the future measurement field of view. The selection of the example of the angular sample increment of 10 degrees throughout the specification was done only to simplify the description, other embodiments use significantly lower increments. Still in other embodiments, higher increments are used. The scan measurement information or data which could be used to reconstruct the measurement is then stored (506) in the scene data base of 404. Moreover, in one embodiment, the measurement information includes an accuracy estimate. The scan measurement information is stored in a consistent sequence organized by location. A consistent sequence refers to a specific earth reference heading (for example north) and with a specific angular increment. An accuracy estimate is a statistical value reflecting the quality of the range and position information. There are many methods of storing this information including estimating the location of the object for which the reflection was identified, what is important is to be able to reconstruct the range and associated angle for this location at a later time.

Once, the measurement information is stored (506), it is then determined if the traversal of the select area is complete (512). If the traversal is not complete (512), the vehicle is then moved to a next location (508). The location and heading is then estimated (510). Methods used to estimate the location and heading include, but are not limited to, dead reckoning based at least in part on a magnetic heading and wheel speed, inertial navigation and GPS positioning. Once the location and heading is estimated (510), the process continues at step (504). Once the traversal through the select area is complete at (512), it is then determined if improved range estimation quality is required in the map (514). If an improved quality is required (514), the process continues at step (502). If an improved range estimate quality is not required (514), the process ends.

Figure 6:
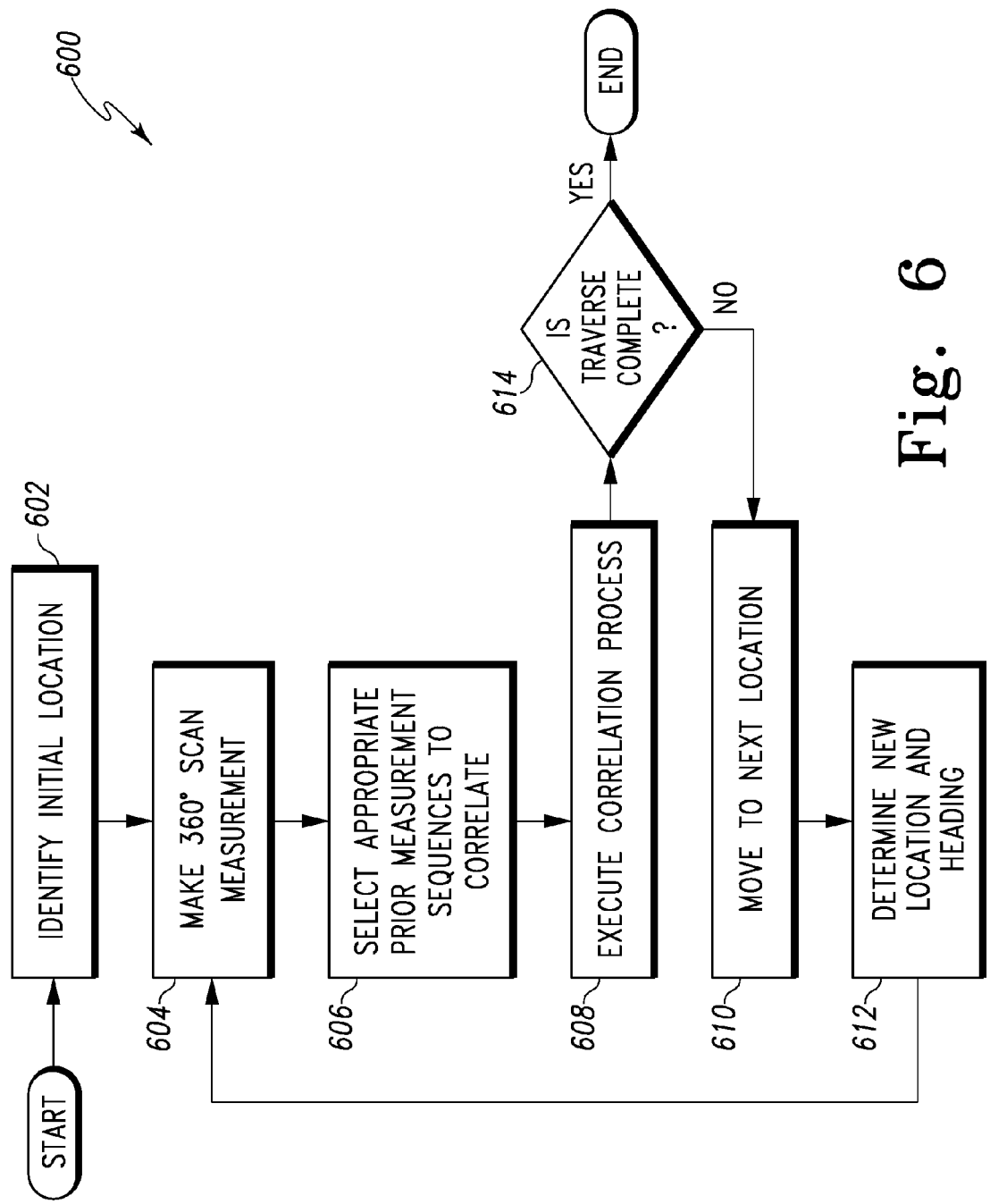
FIG. 6 is a retraversal location flow diagram of one embodiment of the present invention.

A retraversal localization flow diagram 600 illustrating one method of retraversal of one embodiment of the present invention is shown in FIG. 6. As illustrated, the process starts by identifying an initial location (602). This is done consistent with the original traverse. An example of an initial location is the current location sector 430 of FIG. 4C. A 360 degree scan is then measured (604). A smaller scan could be used with varying increments independent of the original scan. Hence the present invention is not limited to 360 degree scans. Next, the appropriate prior measurement sequences are selected to correlate (606). In this step (606), select adjacent sectors, such as adjacent sectors 432 in FIG. 4C are selected. A correlation process for previous scans within the region of interest is executed at step (608). The correlation process determines a new estimate of location, heading and location quality based on the currently measured range scan (604) relative to the sequences identified in (606) which are stored in (506 & 104). In one embodiment, the scene database is updated if the results warrant an update to improve the scene database quality for this or another location for a future position and heading determination. Moreover, in one embodiment if GPS becomes available in the retraversal, the measured range, angle and quality information is used to update the scene database. The location and heading results are outputted at step (608). This information may be fused with the optional navigation sensor in FIG. 1 using a filter prior to output.

Once the correlation process is complete (the position and heading is output), it is determined if the traversal is complete (614). If the traversal is complete (614), the process ends. If the traversal is not complete (614), the vehicle is moved to the next location (610). The location and heading of the new location is then estimated (612). Processes employed by embodiments of the present invention include but are not limited to dead reckoning (magnetic heading and wheel speed) and inertial navigation. A Kalman filter or equivalent process is used to merge the location, heading and quality measurement of step (608) with the location and heading data from the optional sensors to improve the estimation of the new location at step (612) to aid the scene selection 606. The next scan is then performed in 604 and the process continues to move and estimate the new position and heading.

Figure 7:
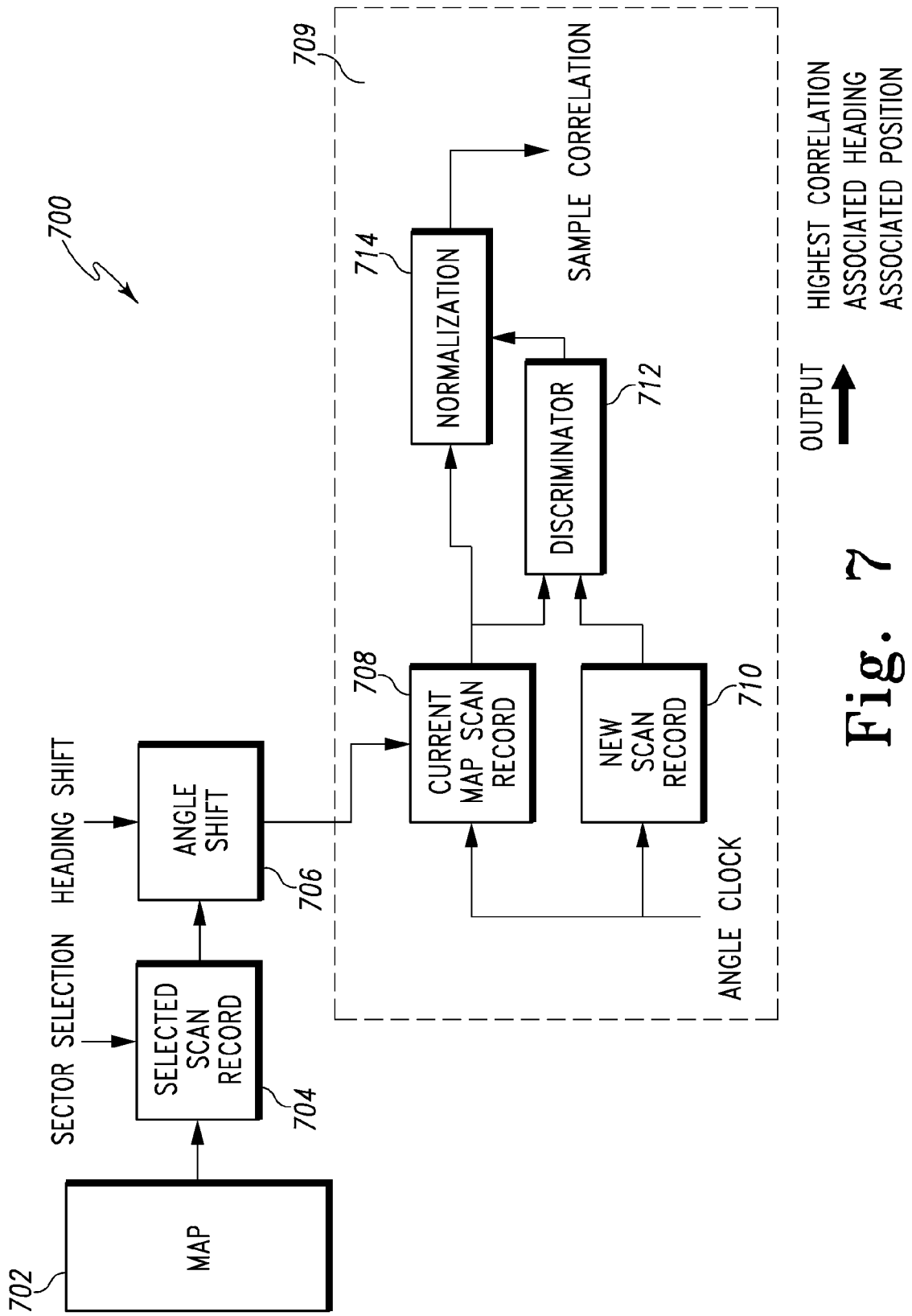
FIG. 7 is a block diagram of processor function of one embodiment of the present invention.

A block diagram of processor function 700 of one embodiment of the present invention is illustrated in FIG. 7. The processor function 700 illustrates one physical embodiment used to execute correlation process step (608) of the retraversal localization flow diagram 600 of FIG. 6. Referring back to FIG. 7, the processor function includes a map 702, a selected scan record 704, and angle shift 706 and a correlation system 709. The map 702 includes a plurality of registers that stores ranging and associated angles information. In one example, the map 702 includes a block of 42 registers one for each sector in FIG. 4C. In another embodiment, the map 702 contains information which identifies the location of objects required to regenerate the scan sequence for a specific sector which could then be loaded into registers. The selected scan record 704 includes scene data which includes potential solutions and could be loaded into registers or information from which data could be generated to enter into registers for comparison to the current range scan. As illustrated, the selected scan record hardware receives the selected scene to be tested for correlation. The selector section input designates which sector in the block of scene data base registers in the map 702 is to be evaluated. In one example, the current register stores 42 sequences of information relating to ranges and associated headings that cover 360 degress at 10 degree increments. The angle shift 706 includes the currently selected scene sequence that is shifted by the 10 degree increments which identify the heading estimate. As illustrated In FIG. 7, the angle shift 706 receives a heading shift input that provides the scene offset which defines the sequence to be used to test correlation.

The correlation system 709 of this embodiment includes a current scan sequence record 708, a new scan record 710 (obtained from the LIDAR in 608), and a discriminator and normalization device 714. In one example, both the current scan sequence record 708 and the new scan record 710 are shift registers having a size of 36 which result from the angular increment of 10 degrees and the scan range of 360 degress. In this example, the current scan sequence record 708 will includes the range information associated with 36 angles received from the angle shift 706 (the next sequence to be tested). The new scan record 710 contains ranging and associated angles information relating to the then current range measurement received from the LIDAR in 604. This sequence in 710 will not change until there is movement to a new location within the select area or more specifically and new 360 degree range scan is completed. The information in the registers in the current scan sequence record 708 and the new scan record 710 are clock out by an angle clock to the discriminator 712. The discriminator 712 simply determines the difference between the information from the current scan sequence record 708 and the information from the new scan record 710. It should be noted that orienting the heading of the scene sequence 704 in 706 or the current range measurement sequence received from the LIDAR in 710 is equivalent. The normalization 714 normalizes the correlation output of the discriminator 712 based on the quality factor of the measurements stored. A sample correlation is then output as illustrated in FIG. 7. The sum of the absolute values of each of the 36 correlation samples becomes the correlation coefficient for this sequence. In another embodiment of the correlation system 709, a Pearson's correlation coefficient is used to compute the correlation between the respective sequences reconstructed from the map and the current range scan obtained for the LIDAR in 604. Pearson's correlation coefficient can be implemented in a processor and returns a value of 1 for high correlation and 0 for low correlation which is a nice property because it is a quality factor. Other embodiments use different types of discriminators or correlation techniques and the present application is not limited to a specific type of correlation methodology.

Using the example traversal region map 404 shown in FIG. 4C and the 10 degree angle increment, the processor function 700 of FIG. 7 is further explained. The 9 selected sectors 432 are evaluated. In particular, 9 sequences relating to the 9 sectors are processed through via the sector selection input to the selected scan record 704. Each sequence contains 36 range and angle measurements (10 degree angle increments for 360 degrees). Hence there will be 36 heading shifted sequences for each of the nine sector sequences. The 36 heading shifts are processed through via the angle shift 706 using the heading shift as an input. Each comparison requires 36 angle clocks through the discriminator 712. In this example there will be 9×36×36=11664 clocks through the discriminator 712 and 9×36=354 unique sequence tests (36 for each of 9 selected scenes) each resulting in a correlation coefficient. The correlation coefficient reflecting the greatest correlation (whether higher or lower depending on the implementation) will result in the selection of one sequence of one scene defining the heading (shift sequence) and location (scene sequence).

Figures 8A, 8B:
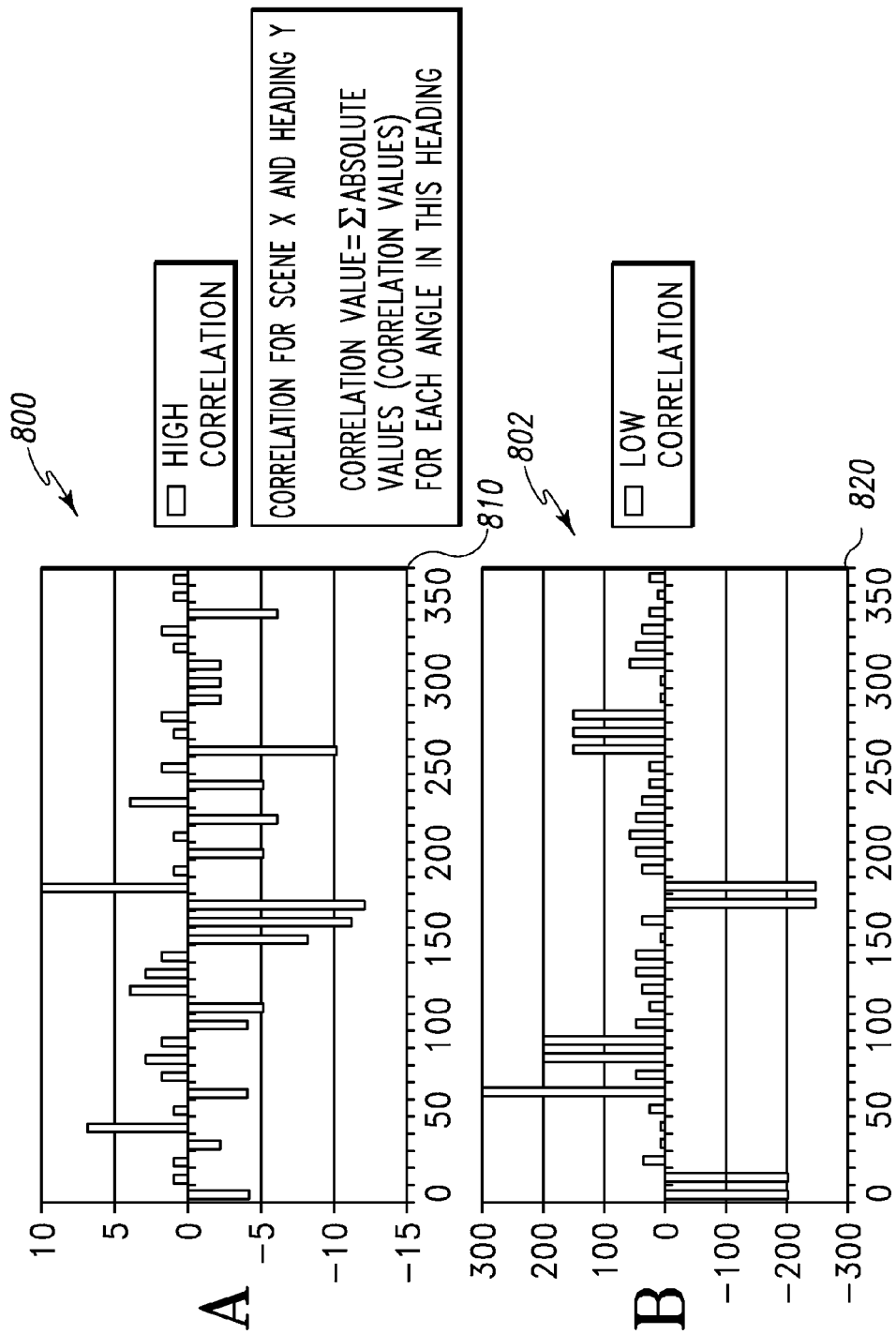
FIG. 8A is an example of a correlation graph.
FIG. 8B is an example of another correlation graph.

Examples of correlation graphs 800 and 802 are illustrated in FIGS. 8A and 8B respectively. The correlation values in this example equal a summation of absolute values of the correlation estimates for every respective angle in the sequence. In regards to the graphs 800 and 802 the angle degrees are illustrated along axis 810 and 820 respectively. Comparatively, Graph 800 illustrates a good correlation sample that would indicate that the sequence represented by this heading shift and a previously stored location are likely the current location and heading. Graph 802 illustrates an unlikely sequence and heading combination with low correlation. In one embodiment, an absolute value of the normalized discriminator output (illustrated by the correlation graphs) is taken and summed up. Hence, for each respective angle, a value is determined by the discriminator 712. In this example, we will get out 36 values that are compared at a given heading in a given scene. The one with the lowest correlation value has the most correlated in this example. However, each sector of the 9 sectors and headings would be evaluated in this example. The overall lowest value of all the sample correlations will determine the location and heading. There are many methods of determining the correlation between the current a previous scenes understood here including but not limited to the use of discriminators or Pearson's correlation coefficient as described above.

Figure 9:
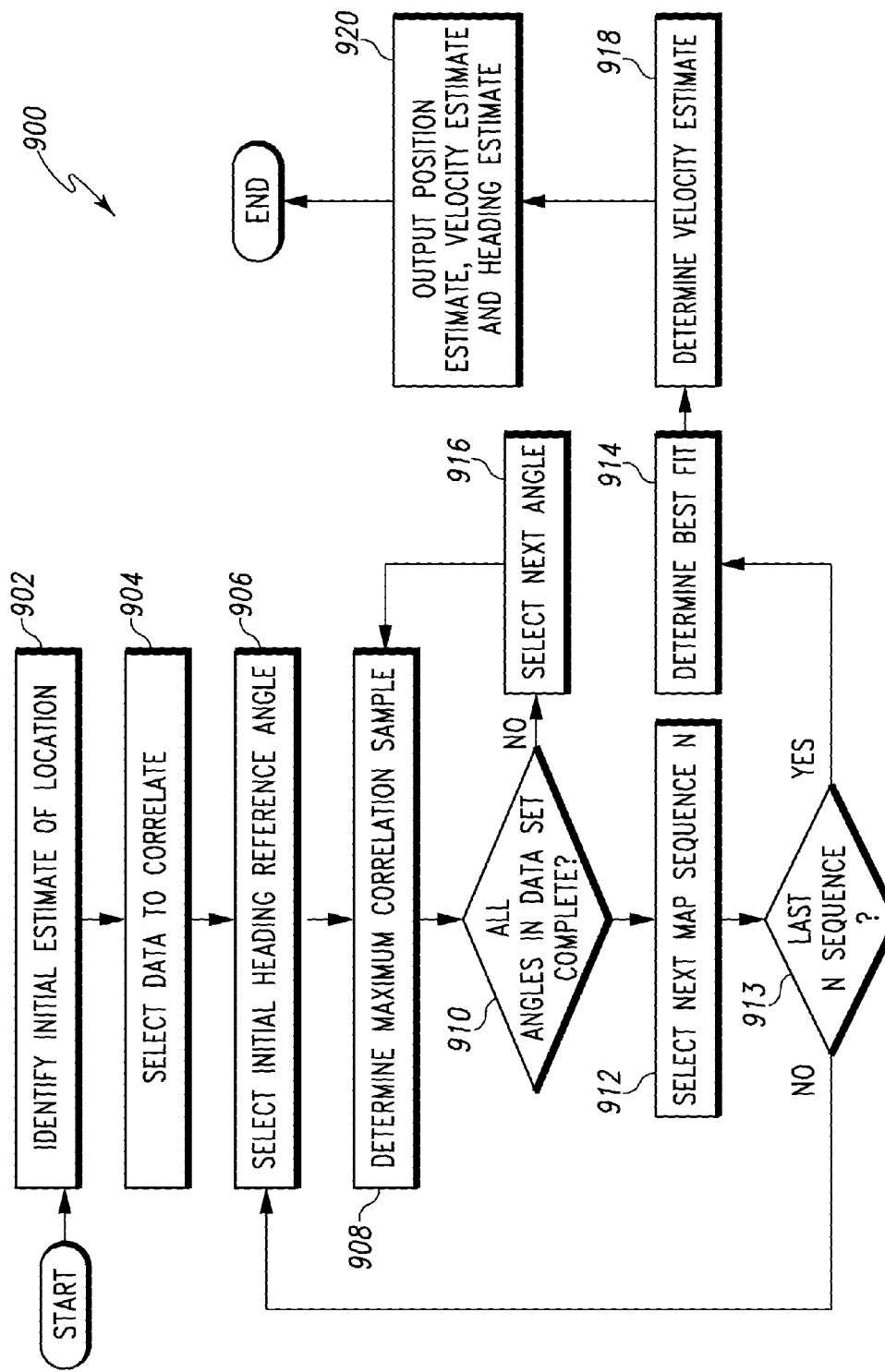
FIG. 9 is a correlation process flow diagram outputting localization and heading information of one embodiment of the present invention.

Referring to FIG. 9 a localization and heading determination flow diagram 900 illustrating one method of one embodiment is shown. In particular, flow diagram 900 describes one method of implementing the step 608 of FIG. 6. The process starts by identifying an initial estimate of location (902) taken from 602 or 612. Data is then selected to correlate with the measurement (904). One possible method employed is to select the closest "N" map locations. An alternative is to execute a scan and compare against all stored sequences. An initial heading reference is then selected (906) and the correlation value is determined for the sample (908). Various methods employed by a discriminator can be applied. This method does not require a specific starting point. As discussed above, in one example, a discriminator is based on a simple difference between stored and measured range. Then each measured angle is normalized with the statistical measure of uncertainty for example using the hardware of 708, 710, 712 and 714 of FIG. 7. The heading and position will be selected as the angle shift and location sample which give the lowest correlation value in this example. The correlation value is the sum of the absolute value of the discriminator for each sampled angle of the new measurement. The correlation quality is the minimum correlation value over the average correlation value in one embodiment. It will, however, be understood by those skilled in the art, that many methods exist for determining highest correlation between stored sequences and measurements (low correlation quality) and the present invention is not limited to a specific method.

Next it is determined if all heading angles in a selected sector's scene have been considered (910). If they have not been all considered (910), a next angle is selected at (916). The process then continues at (908). Once all the angles in a data set have been considered (910), a next map location (sector) is selected (912). It is then determined if the last of the N sequences (sectors) has been evaluated (913). If the last sector has not been evaluated (913), the process resumes at step (906). If the last sector of N sectors has been evaluated (913), a best fit based on the maximum correlation sample is determined (914). This is done by identifying the data set with the maximum correlation between the initial (sequence resulting from the scene data base) and the current measured range scan based on high correlation output (i.e. position, heading) 800. Correlation quality is computed to access probability and determine if an update of the sequence database is beneficial. The position estimate and heading for the next position in the process is output in step (914). Velocity estimate for dead reckoning is estimated at step (918) by differencing the position information and dividing by a time step. Other methods could be used to determine the velocity. Position estimate, velocity estimate and heading estimate is then output at (920). The output can be used for a navigation filter input depending on the navigation method and sensor suite.

The location output is the center of the section which has the highest correlation. The accuracy of the output is based on the size of the selected sector within 432. If additional accuracy is required three methods are easily accomplished. The first method includes reducing the size of the sectors (increasing the number of sectors required in the map). The second is to break the selected sector into sub sectors (9 could be easily identified) and reprocessing the data using the process identified above. A third method includes processing the differences between, the stored sequence selected in the correlation test and the current range measurement sequence, to minimize the difference by adjusting the assumed location within the sector. A simple approximation is provided below:

```
Map[1-36] ; Map samples
Meas[1-36]; Scan samples
For a = 10 to 360 by 10
    sum = sum + 1
    Delt = Map (a/10) − Meas(a/10)
        If (sector size/2 > abs(Delt) > sector size) then
        Delt = 0 and sum = sum − 1
    Dx = Delt*sin(a)
    Dy = Delt*cos(a)
    Xerror = Dx + Xerror
    Yerror = Dy + Yerror
```

-continued

```
End for
Xerror = 2*Xerror/sum
Yerror =2* Yerror/sum
```

The Xerror and Yerror are added to the initial x, y position to obtain an improved solution.

Although, the above is generally described as being applied in two dimensions embodiments of the present invention are also applicable to operation in three dimensions (3D). In these embodiments, objects are ranged in more than one dimension to obtain a 3D rendering. As one in skilled in the art will understand, in a 3D embodiment, not only can the position and heading be determined but also a 3D location and attitude. Techniques described above are then used on the 3D data to determine a then current 3D location, attitude and heading. In particular, data relating to ranging and attitude associated with each angle is stored in the sequence database during an initial traversal through the select area. The attitude data includes associated orientation angles of pitch, roll and yaw with regard to objects. During a subsequent retraversal through the select area, current range and attitude data associated with an angle is correlated as described above with select stored data in the sequence database. In one embodiment, a flash LADAR is used to obtain samples of the objects in more than one dimension. In another embodiment, a scanning LADAR is bobbed to obtain samples of the objects in more than two dimensions.

The methods and techniques described here may be implemented in digital electronic circuitry, or with a programmable processor (for example, a special-purpose processor or a general-purpose processor such as a computer) firmware, software, or in combinations of them generally defined as modules. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of navigating with use of correlation position determination, the method comprising:
identifying an initial location and heading of an operator-less vehicle in a select area, the operator-less vehicle including a ranging device and a processor;
conducting a 360° range scan with the ranging device while the operator-less vehicle is initially traversing throughout the select area;
storing data from the range scan required to reconstruct ranges and associated angles to objects into a scene database wherein the range scan data is stored with respect to an earth reference heading at selected angular implements;
estimating an initial location of the operator-less vehicle—ring a subsequent traversal of the select area;
measuring current ranges and associated angles to the objects with the ranging device during the subsequent traversal by the operator-less vehicle throughout the select area;
correlating the current ranges and associated angles to the objects to reconstructed ranges and associated angles to the objects from the stored data using the processor;
determining at least one of current location and heading estimates within the select area based at least in part on correlation results using the processor; and
using the at least one of the current location and heading estimates for navigation.

2. The method of claim 1, wherein the stored data required to reconstruct ranges and associated angles is a map identifying estimated locations of the objects.

3. The method of claim 1, further comprising:
storing data required to reconstruct ranges and associated orientation angles of pitch, roll and yaw with regard to the objects while the operator-less vehicle is initially traversing throughout the select area;
measuring current ranges and associated orientation angles of pitch, roll and yaw with regard to the objects during the subsequent traversal of the operator-less vehicle throughout the select area;
correlating the current range and associated orientation angles of pitch, roll and yaw with regards to the objects to reconstructed ranges and associated orientation angles of pitch, roll and yaw with regards to the objects from the stored data; and
determining a current three-dimensional location and attitude estimate within the select area based at least in part on the correlation results.

4. The method of claim 1, wherein correlating further comprises:
improving an accuracy of the current location estimate by processing a scan to estimate the location within one or more sectors of the select area.

5. The method of claim 1, further comprising:
using at least one of inertial data, dead reckoning and GPS in estimating the current location.

6. The method of claim 1, wherein correlating the current ranges and associated angles to the objects to reconstructed ranges and associated angles to the objects from the stored data is implemented by a discriminator.

7. The method of claim 6, further comprising:
normalizing an output of the discriminator based on quality of the data.

8. The method of claim 4, further comprising:
enhancing the current location estimate by at least one of reducing a size of the one or more sectors in the select area, and breaking the one or more sectors into sub-sectors and reprocessing range and associated angle data to estimate the location within one of the sub-sectors in the select area.

9. A method of navigating with use of correlation position determination, the method comprising:

identifying an initial location and heading of an operator-less vehicle traversing a select area an initial time;

while traversing the select area the initial time, performing a 360° range scan with a ranging device on the operator-less vehicle to determine ranges and associated angles to objects;

storing the ranges and associated angles to objects in a scene database to create a map of sectors of distances and associated angles to objects throughout the select area;

estimating an initial location during a subsequent traversal of the operator-less vehicle through the select area;

conducting a range scan with the ranging device at the estimated initial location to determine ranges and associated angles to objects;

selecting an appropriate sector of the map of stored ranges and associated angles in the scene database based at least in part on the estimated initial location;

correlating the ranges and associated angles of the conducted range scan with the ranges and associated angles in the selected sector of the map to determine at least one of current location and heading using a processor; and outputting the at least one of current location and heading for use in navigation.

10. The method of claim 9, wherein correlating the ranges and associated angles of the conducted range scan with the ranges and associated angles in the selected sector of the map to determine at least one of current location and heading further comprises:

shifting through angles at each selected sector of the map by a select increment;

applying a discriminator to the ranges and associated angles of the conducted range scan with the ranges and associated angles in the selected sector of the map; and normalizing an output of the discriminator.

11. The method of claim 10, further comprising:

shifting a scan sector of the map to at least one relative sector to the selected sector based at least in part on the estimated current location;

conducting a range scan at the at least one relative sector to determine ranges and associated angles to objects; and correlating the ranges and associated angles of the at least one relative sector conducted range scan with the ranges and associated angles in the selected sector of the map.

12. The method of claim 9, further comprising:

moving to a subsequent location within the select area;

conducting a subsequent range scan at the subsequent location to determine ranges and associated angles to objects;

selecting an appropriate subsequent sector of the map of stored ranges and associated angles in the scene database; and correlating the ranges and associated angles of the conducted subsequent range scan with the ranges and associated angles in the selected subsequent sector of the map to determine at least one of current location and heading.

13. A navigation system for an operator-less vehicle, comprising:

a ranging device; and a processor operatively coupled to the ranging device and configured to execute program instructions comprising:

identifying an initial location and heading of the operator-less vehicle in a select area;

conducting a 360° range scan with the ranging device while the operator less vehicle is initially traversing throughout a select area;

storing data from the range scan required to reconstruct ranges and associated angles to objects into a scene database wherein the range scan data is stored with respect to an earth reference heading at selected angular implements; estimating an initial location of the operator-less vehicle during a subsequent traversal of the select area;

measuring current ranges and associated angles to the objects with the ranging device during the subsequent traversal by the operator-less vehicle throughout the select area;

correlating the current ranges and associated angles to the objects to reconstructed ranges and associated angles to the objects from the stored data;

determining at least one of current location and heading estimates within the select area based at least in part on correlation results; and using the at least one of the current location and heading estimates for navigation.

* * * * *